(12) United States Patent
Kellner et al.

(10) Patent No.: US 11,327,154 B2
(45) Date of Patent: May 10, 2022

(54) ERROR ESTIMATION FOR A VEHICLE ENVIRONMENT DETECTION SYSTEM

(71) Applicant: VEONEER SWEDEN AB, Vargarda (SE)

(72) Inventors: Dominik Kellner, Dachau (DE); Armin Stangl, Maisach (DE)

(73) Assignee: VEONEER SWEDEN AB, Vargarda (SE)

( * ) Notice: Subject to any disclaimer, the term of this patent is extended or adjusted under 35 U.S.C. 154(b) by 198 days.

(21) Appl. No.: 16/621,826

(22) PCT Filed: Jun. 5, 2018

(86) PCT No.: PCT/EP2018/064780
§ 371 (c)(1),
(2) Date: Dec. 12, 2019

(87) PCT Pub. No.: WO2018/228869
PCT Pub. Date: Dec. 20, 2018

(65) Prior Publication Data
US 2021/0302534 A1    Sep. 30, 2021

(30) Foreign Application Priority Data

Jun. 13, 2017 (EP) .................................... 17175647

(51) Int. Cl.
*G01S 7/40* (2006.01)
*G01B 15/00* (2006.01)
(Continued)

(52) U.S. Cl.
CPC ............... *G01S 7/40* (2013.01); *G01B 15/00* (2013.01); *G01S 13/867* (2013.01); *G01S 13/931* (2013.01); *G01S 2013/93271* (2020.01)

(58) Field of Classification Search
CPC ..... G01D 1/18; G01S 7/52004; G01S 7/4091; G01S 13/723; G01S 5/30
See application file for complete search history.

(56) References Cited

U.S. PATENT DOCUMENTS 4,713,768 A * 12/1987 Kosaka ..................... G01S 5/30
701/518
6,359,586 B1 * 3/2002 Sviestins ............... G01S 13/723
342/195

(Continued)

FOREIGN PATENT DOCUMENTS

CN         101231340 A  *  7/2008  ............... G01S 7/40
DE   10 2007 018 470 A1    10/2008
(Continued)

OTHER PUBLICATIONS

International Search Report and Written Opinion of PCT/EP2018/064780 dated Jul. 2, 2018.

*Primary Examiner* — Bernarr E Gregory
(74) *Attorney, Agent, or Firm* — Dickinson Wright PLLC; Steven L. Oberholtzer

(57) ABSTRACT

A vehicle environment detection system (2) including a control unit (4) and a sensor arrangement (3) that in turn includes at least two sensor arrangement parts (3a, 3b). The control unit (4) is arranged to determine one or more systematic errors in a certain direction (9, 10) for one sensor arrangement part (3a, 3b) by combining acquired sensor data for the sensor arrangement part (3a, 3b) with acquired sensor data from another sensor arrangement part (3b, 3a). The another sensor arrangement part (3b, 3a) has a lower degree of systematic error in the certain direction (9, 10) than the sensor arrangement part (3a, 3b).

12 Claims, 7 Drawing Sheets

(51) Int. Cl.
   *G01S 13/86* (2006.01)
   *G01S 13/931* (2020.01)
   *G01S 13/00* (2006.01)

(56) References Cited

U.S. PATENT DOCUMENTS

| | | | |
|---|---|---|---|
| 6,393,370 B1 * | 5/2002 | Soika | G01S 7/52004 |
| | | | 702/104 |
| 6,903,677 B2 | 6/2005 | Takashima et al. | |
| 8,125,372 B2 | 2/2012 | Focke et al. | |
| 9,313,462 B2 * | 4/2016 | Einecke | G01S 13/931 |
| 2005/0062615 A1 * | 3/2005 | Braeuchle | G01S 7/40 |
| | | | 340/903 |
| 2007/0182623 A1 * | 8/2007 | Zeng | G01S 13/867 |
| | | | 342/174 |
| 2008/0300787 A1 | 12/2008 | Zeng | |
| 2010/0085238 A1 | 4/2010 | Focke et al. | |
| 2016/0116573 A1 | 4/2016 | Appia | |
| 2016/0275359 A1 | 9/2016 | Yoshida et al. | |

FOREIGN PATENT DOCUMENTS

| | | | | |
|---|---|---|---|---|
| DE | 11 2014 005 376 T5 | 8/2016 | | |
| EP | 1 462 823 A1 | 9/2004 | | |
| EP | 2 639 791 A1 | 9/2013 | | |
| EP | 2639781 A1 * | 9/2013 | | G01S 13/931 |
| FR | 3036204 A1 * | 11/2016 | | G01S 7/41 |

\* cited by examiner

ERROR ESTIMATION FOR A VEHICLE ENVIRONMENT DETECTION SYSTEM

CROSS-REFERENCE TO RELATED APPLICATIONS

This application is a 35 U.S.C. § 371 national phase of PCT International Application No. PCT/EP2018/064780, filed Jun. 5, 2018, which claims the benefit of priority under 35 U.S.C. § 119 to European Patent Application No. 17175647.1, filed Jun. 13, 2017, the contents of which are incorporated herein by reference in their entirety.

FIELD OF THE INVENTION

The present disclosure relates to a vehicle environment detection system including a control unit and a sensor arrangement that in turn includes at least two sensor arrangement parts.

BACKGROUND

Today, vehicle environment detection systems, such as for example camera systems, Doppler radar systems and LIDAR systems, can be mounted on a vehicle in order to detect objects in order to implement automated vehicle systems such as speed control and collision prevention, as well as other such as auto alignment, online bumper fascia calibration, ego motion estimation, scene understanding, lane keeping assist (LKA) and automated driving (AD).

Radar systems are arranged to produce an output of a series of reflection points as measured by radar sensors. These reflection points can be treated as separate detections or grouped as tracked objects, providing a common motion state for an extended object.

Camera systems present image data including a plurality of image pixels representing detected images.

The detected objects confer information of relevant objects, e.g. vehicles, pedestrians, road boundaries etc. This information is further called object states and can for example constitute position states such as the distance from the host vehicle to the object in Cartesian coordinates. The object states can also constitute position states such as motion states such as velocity and acceleration in Cartesian coordinates. To obtain a precise and reliable estimate, usually multiple sensors from different environment detection systems are fused, such that a common object state is calculated out of the individual measurements over time. A possible implementation is a Kalman Filter.

Nevertheless, beside the measurement noise, usually assumed to be zero-mean Gaussian distributed which normally can be taken care of by a Kalman filter, many sensors have unneglectable systematic errors such as for example bias and gain errors which for example can occur due to calibration errors or wrong model assumptions. Further, a systematic error can be referred to a single sensor, a relation between sensors or a single object.

By way of example, a mono-camera assumes a fixed width of a vehicle and uses this information to obtain a distance value, which can constitute a wrong model assumptions.

If a relatively large vehicle, having a width that exceeds the fixed width, is detected by the mono-camera, it follows that the position always is underestimated, the vehicle seems closer than in reality, since it is linear with the distance to the object. In contrast, a vehicle, with a width smaller than the fixed width, its position is always overestimated, it seems to be farer away than in reality.

US Publication No. 2016/0116573 discloses generating an alignment matrix for a camera-radar system where fusion between image data from the camera subsystem and radar data from the radar subsystem is desired. In this manner, online calibration/alignment is provided.

It is, however, desired to provide a vehicle environment detection system that takes care of systematic sensor errors in a more versatile, efficient and reliable manner, which also is an object of the present disclosure.

SUMMARY AND INTRODUCTORY DESCRIPTION OF EMBODIMENTS OF THE PRESENT INVENTION

The above-expressed object is achieved by use of a vehicle environment detection system including a control unit and a sensor arrangement that in turn includes at least two sensor arrangement parts. The control unit is arranged to determine one or more systematic errors in a certain direction for one sensor arrangement part by combining acquired sensor data for the sensor arrangement part with acquired sensor data from another sensor arrangement part. The other sensor arrangement part has a lower degree of systematic error in the certain direction than the sensor arrangement part.

The object is also achieved by use of a method for determining one or more systematic errors in a certain direction for at least one sensor arrangement part used in a vehicle environment detection system having at least two sensor arrangement parts.

The method includes the steps of:

Acquiring sensor data from the sensor arrangement part.

Acquiring sensor data from another sensor arrangement part, which another sensor arrangement part has a lower degree of systematic error in the certain direction than the sensor arrangement part.

Determining one or more systematic errors in the certain direction for the sensor arrangement part by combining the acquired sensor data from the sensor arrangement parts.

According to some aspects of embodiments of the present invention, the vehicle environment detection system is arranged to be mounted to an ego vehicle adapted to be running forward in an x-direction, where a first sensor arrangement part is in the form of a camera sensor device and a second sensor arrangement part is in the form of a radar sensor device. The camera sensor device has a detection error in the x-direction, and where the radar sensor device has a detection error in a y-direction, perpendicular to the x-direction.

According to some aspects of embodiments of the present invention, the camera sensor device is arranged to assume a fixed width of all targets while a target vehicle has a real target vehicle width. A camera measured detection is detected at a camera measured distance that differs from a radar measured distance of a detected radar measured detection, where the radar measured distance is closer to a real distance than the camera measured distance. The control unit is arranged to calculate an estimate of the real target vehicle width by multiplying the fixed width with a relation between the radar measured distance and the camera measured distance.

According to some aspects of embodiments of the present invention, the radar sensor device is adapted to provide a radar measured distance to a certain detection on a target vehicle, while the camera sensor device is adapted to provide detected pixel width of the target vehicle in camera pixels. The control unit is arranged to calculate an estimated real width of the target vehicle according to:

$$w_r = \frac{d_{ra}}{f} \cdot w_p,$$

where $w_r$ is the real width, $d_{ra}$ is the radar measured distance, f is a focal length of the camera sensor device and $w_p$ is the detected pixel width.

Other examples are disclosed in this description.

A number of advantages are obtained by use of the present disclosure. Mainly, a vehicle environment detection system is provided that takes care of systematic sensor errors in a more versatile, efficient and reliable manner than previously.

By combining two measurements, e.g. from a radar sensor and a camera sensor, model parameters can be estimated, which cannot be estimated by a single sensor itself, e.g. the width of a vehicle. Even when the radar sensor no longer is able to detect the object, the camera sensor still has the previously acquired correct width, and its accuracy is significantly increased.

The same holds for e.g. the mounting orientation of the radar sensor. If the mounting orientation has been estimated by comparing radar sensor measurements and camera sensor measurements, even objects only detected by the radar sensor can be corrected by use of the previously acquired mounting orientation. Using non-volatile memory, the mounting orientation can be stored and directly applied after the system is restarted.

In general, the output of sensors which underlie systematic errors can be significantly improved. Further even association between two sensors is improved, since systematic errors causing a large deviation can be compensated for.

BRIEF DESCRIPTION OF THE DRAWINGS

The present disclosure will now be described more in detail with reference to the appended drawings, where.

DETAILED DESCRIPTION

Figure 1:
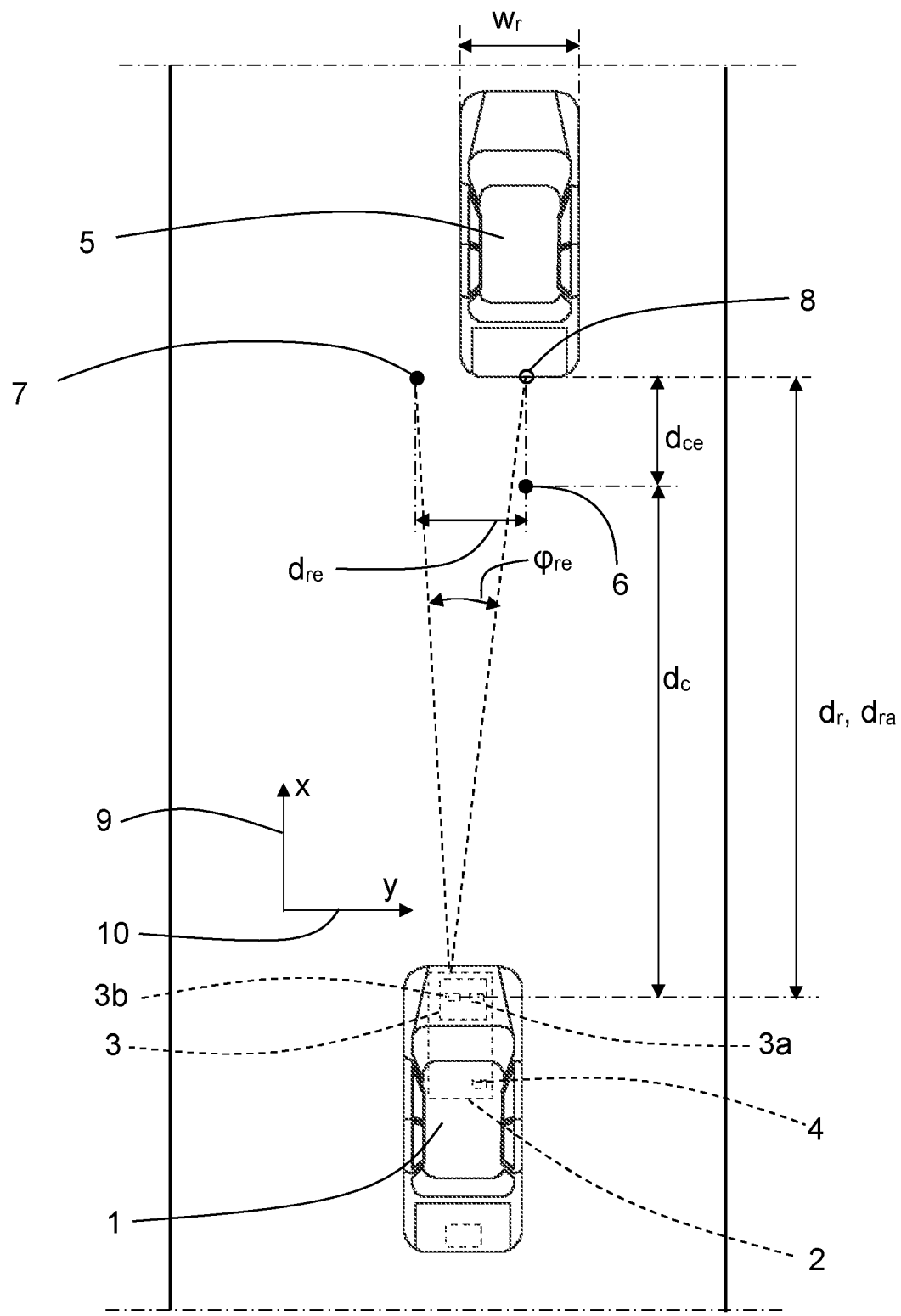
FIG. 1 shows a schematic top view of an ego vehicle and a target vehicle.

With reference to FIG. 1, showing a top view of an ego vehicle 1, the ego vehicle 1 includes a vehicle environment detection system 2 that in turn includes a sensor arrangement 3 and a control unit 4.

The sensor arrangement 3 includes a first sensor arrangement part 3a and a second sensor arrangement part 3b, where the first sensor arrangement part 3a includes an environment data input device in the form of a camera sensor device 3a. The second sensor arrangement part 3b includes an environment data input device in the form of a radar sensor device 3b, where the sensor devices 3a, 3b are arranged to acquire sensor data by use of measurements. Acquired sensor data is handled by the control unit 4.

In FIG. 1, the ego vehicle 1 is travelling behind a target vehicle 5 along an x-direction 9, and the camera sensor device 3a detects a measured camera detection 6 and the radar sensor device 3b detects a radar measured detection 7. The measured detections 6, 7 are intended to represent a real detection 8 on the target vehicle 5, but due to inherent sensor errors the measured detections 6, 7 deviate from the real detection 8.

The sensor error of the camera sensor device 3a is due to the use of model parameters, where a model parameter can be an internal parameter, such as an assumed constant fixed width $w_f$ of all target vehicles. These model parameters can contain systematic errors, for example in the present case the target vehicle 5 has an actual target vehicle width $w_r$.

Instead of having a fixed assumption about the model parameter, the sensor can wait until the object is seen by both sensors for the first time and directly estimate the model parameter. In this context the term systematic error refers to a direct estimation of model parameters as well.

The sensor error of the radar sensor device 3b is due to its mounting orientation, which is a sensor specific model parameter.

The camera sensor device 3a thus has a detection error $d_{ce}$ in the x-direction 9, conferring the camera measured detection 6 a systematic error. The radar sensor device 3b has a detection error $d_{re}$ in a y-direction 10 perpendicular to the x-direction 9, where the detection error $d_{re}$ is due to a misalignment error angle $\Phi_{re}$, conferring the radar measured detection 7 a systematic error as well.

Figure 2:
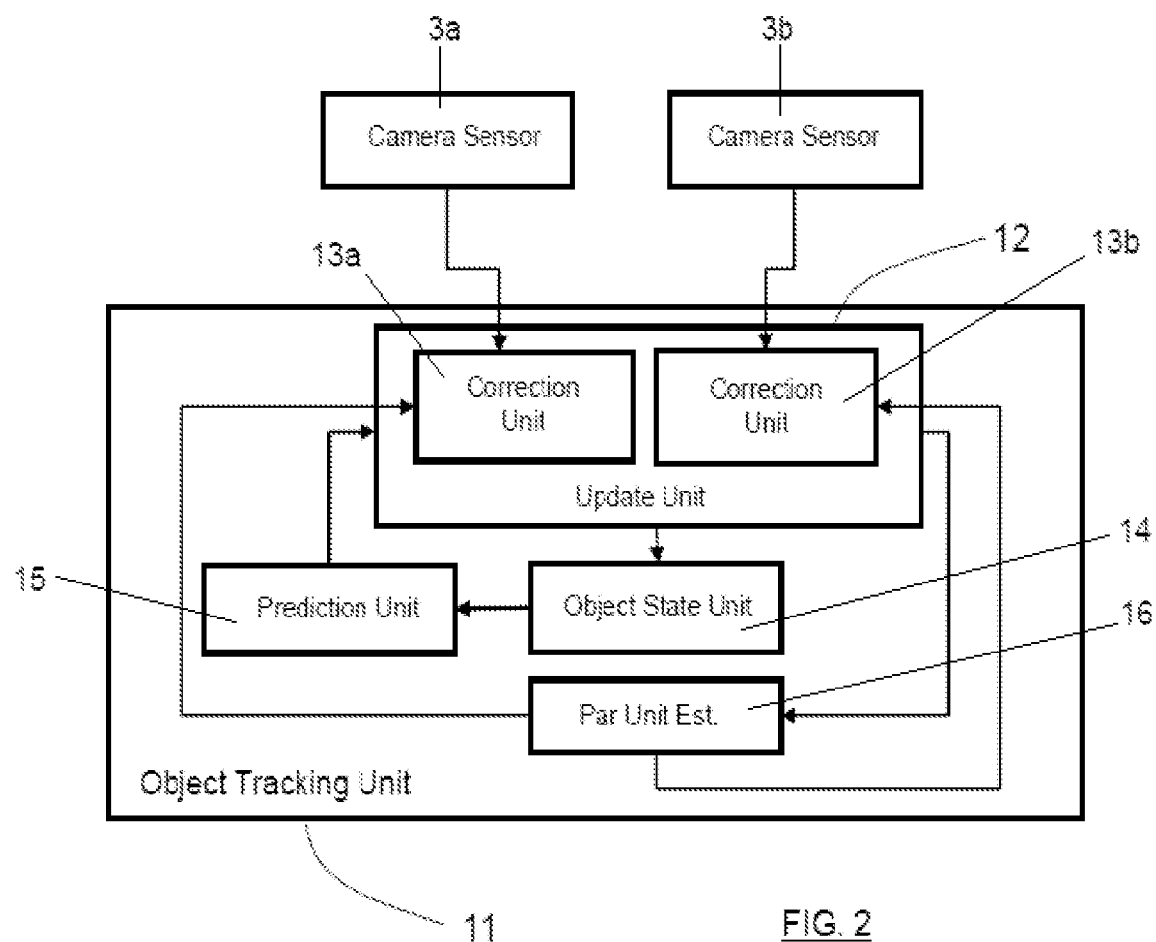
FIG. 2 shows a schematical view of a first example.

With reference also to FIG. 2, sensor measurements are sent to a central object tracking unit 11 includes in the control unit 4. This includes according to some aspects a Kalman Filter; other realization could be a particle filter or just an association algorithm. A track is in this context defined by at least a filter state that consists of the position and its derivatives; at least velocity, but can contain also acceleration and higher derivatives or heading and yaw rate and higher derivatives.

According to the present disclosure, systematic errors in a certain direction for one sensor arrangement part 3a, 3b are estimated by combining acquired sensor data for the sensor part 3a, 3b with acquired sensor data from another sensor arrangement part 3b, 3a, which is free of a systematic error in the certain direction, or at least has a lower degree of systematic error in the certain direction.

The model parameters of the sensor can now be estimated in a single radar cycle or multiple radar cycles, when input from the camera sensor device 3a is available. If the parameter is estimated, all future measurements associated to this target can be corrected, before it updates the track. In this context, a radar cycle is one observation phase during which the vehicle environment detection system 2 is arranged to acquire data, process the data on several signal processing levels and to send out available results. This can be a fixed time interval, or it can be a dynamic time interval depending on environment conditions and processing load.

In the following, a first example embodiment will be described.

For the camera sensor device 3a, according to some aspects of embodiments of the present invention, it is arranged to assume a fixed width $w_f$ of all targets that is 1.8 m, while in this example the target vehicle 5 has a real target vehicle width $w_r$ that is 2.0 m. This means that the relative width error is 10%, and hence the distance from the camera sensor device 3a to the target vehicle has the same error.

In this case, if the target vehicle is at a real distance $d_r$ that is 100 m, the camera measured detection 6 is at a camera measured distance $d_c$ that is 90 m. The radar sensor device 3b does not have any detection error in the x-direction 9, and detects the radar measured detection 7 at a radar measured distance $d_{ra}$ that equals the real distance $d_r$. By use of this information, the control unit 4 is arranged to calculate the real target vehicle width $w_r$, or at least an estimate of the real target vehicle width $w_r$, by multiplying the fixed width $w_f$ with the relation between the radar measured distance $d_{ra}$, here also the real distance $d_r$, and the camera measured distance $d_c$, here 1.8 m*(100 m/90 m)=2 m.

In practice, the radar measured distance $d_{ra}$ can deviate from the real distance $d_r$, and generally the camera measured distance $d_c$ differs from the radar measured distance $d_{ra}$ that is closer to a real distance $d_r$ than the camera measured distance $d_c$. The correct width can be estimated over multiple cycles e.g. by taking the average or using a Kalman Filter, taking measurement uncertainties into account.

In the following, the systematic error of the camera detections is known, and if in a next camera cycle the camera measured distance $d_c$ is 84 m, this position is corrected by multiplying it with the relation between the real target vehicle width $w_r$ and the fixed width $w_f$, here 84*2 m/1.9 m=88.4 m. This means that even if the radar sensor device 3b no longer is able to detect an object, the error of the camera sensor device 3a can still be more or less eliminated; in practice reduced to a very small measurement noise value. The camera measured detection 6 can now be corrected to more or less coincide with the real detection 8.

In FIG. 1, for reasons of clarity, the camera sensor device 3a and the radar sensor device 3b are placed at the same positon in the x-direction 9. This may not be the case in practice, but a difference between the camera sensor device 3a and the radar sensor device 3b in the x-direction 9 is previously known and can be compensated for when performing the above calculations. All distances are assumed to be measured between a present detection and a sensor device that detects the present detection. Alternatively, all distances are according to some aspects assumed to be measured between a present detection and one or more fixed reference points, where the mounting positions of the sensor devices relative to one or more fixed reference points are previously known.

In addition to present object states, the error model parameters are estimated and integrated in an association and update unit 12 in the central object tracking unit 11 as illustrated in FIG. 2. The association and update unit 12 therefore includes a corresponding model parameter correction unit 13a, 13b.

During association, measurements are associated with tracks, and using this association, the measurements update the corresponding track in a following update step. The updated track is sent to an object state unit 14 that is connected to a prediction unit 15 that in turn is connected back to the association and update unit 12. A model parameter estimate unit 16 is arranged to receive information from the association and update unit 12 and to estimate the model parameters of the sensor arrangement parts 3a, 3b in a single radar cycle or in multiple radar cycles. When the parameter is estimated, all future measurements associated to a present target can be corrected by the association and update unit 12 before it updates the track.

In a relatively uncomplicated case, the association step consists of a check of the position derivation between measurement and track. If the deviation exceeds a threshold, no update is performed. If there is a systematic error present, which cannot be handled by a Kalman filter or the like, the association fails. With the correction of systematic errors, association performance is therefore increased.

During update, the track state, e.g. position, is updated with the current measurement, e.g. measured position. Most tracking algorithms assume that there is no systematic error presents, but only a measurement uncertainty. With the correction of systematic errors, a more precise estimation of the state is achieved.

During update, the systematic errors can be limited to a certain value, enabling unrealistic estimates to be suppressed, e.g. for a Kalman Filter using pseudo measurements/limit max value.

Figure 3:
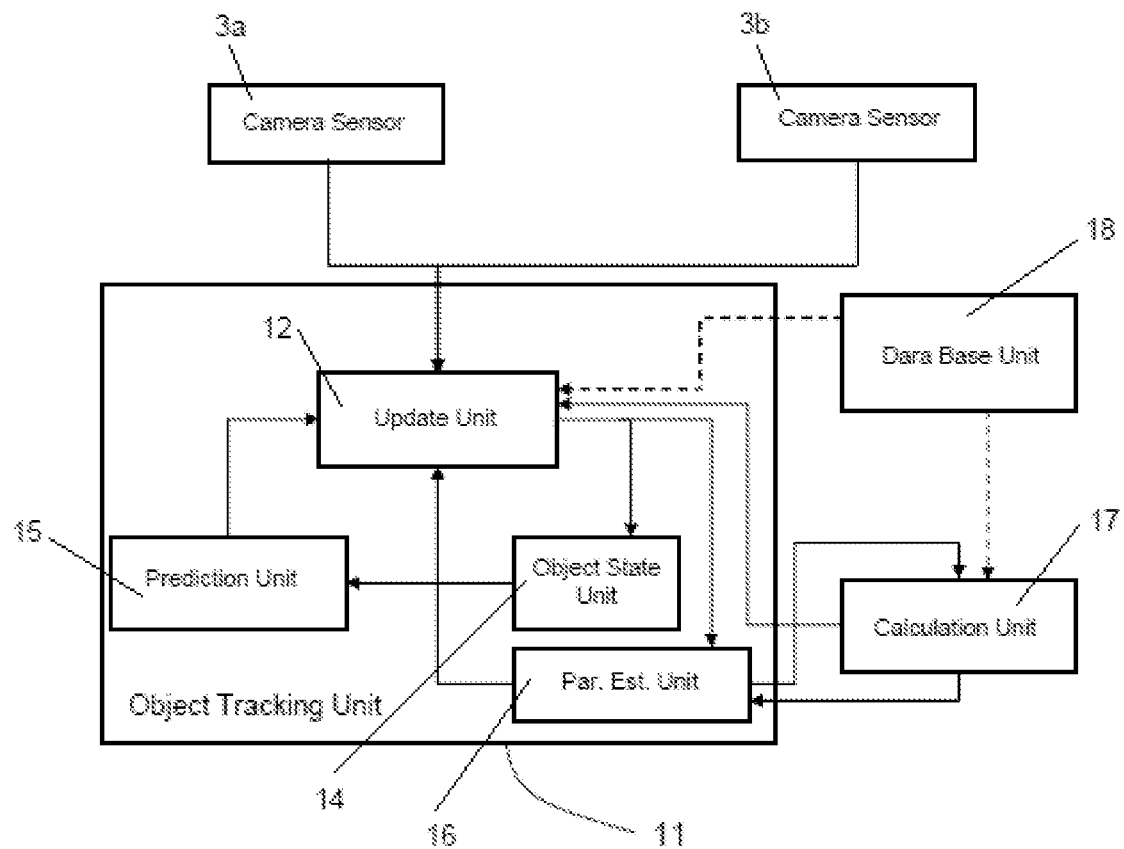
FIG. 3 shows a schematical view of a second example.

In the first example, only parameter errors of single objects are shown. With reference to FIG. 1 and FIG. 3, a further example will be shown. Here, systematic sensor parameters affecting all objects are estimated.

In the same way, the systematic error of the radar sensor device 3b can also be identified and compensated for. The radar measured detection 7 has a detection error $d_{re}$ in the y-direction 10 due to a misalignment of a certain angular value $\varphi_{re}$. By using the corrected camera measured detection, the detection error $d_{re}$ can be determined and since the real distance $d_r$ is known, the misalignment error angle $\varphi_{re}$ can be determined and compensated for.

This means that even if the camera sensor deice 3a no longer is able to detect an object, the misalignment error angle $\varphi_{re}$ can still be more or less eliminated. In a practical application this can not only be done in a single measurement, but based on all associated objects from camera and radar. After calculating the error, even radar objects which are not associated to camera objects can be compensated.

Using the above corrections, the measured detections 6, 7 are corrected and brought close to each other, and a common fused object can be calculated. The camera sensor device 3a has a high accuracy in the y-direction 10, and the radar sensor device 3b in the x-direction 9, so that the fused object after compensation of systematic errors is more accurate in both these directions.

Another systematic error is e.g. due to if the camera sensor device 3a calculates a ground plane, and this ground plane has a systematic error resulting in that all measurements are misplaced. FIG. 3 corresponds to FIG. 2 with some additions.

For each target, which is measured by both sensors devices 3a, 3b, model parameters that include systematic errors are calculated in the model parameter estimate unit 16. Using the estimated model parameters of all targets from the model parameter estimate unit 16, a common parameter such as for example orientation of the radar sensor device 3b, is calculated in a common model parameter calculation unit 17. Having acquired this common parameter, all measurements of the corresponding sensor device 13a, 13b can be corrected and fed back to the model parameter estimate unit 16 and also to the association and update unit 12.

A common parameter is thus calculated taking all tracks classified as vehicles into account. These common parameters can be used to correct the individual parameter estimates, e.g. average, weighted average. A covariance matrix of the estimated parameters can be taken into account as a weighting factor. The estimation itself is according to some aspects a linear regression or a second Kalman Filter. Furthermore, this has the advantage that if a new measurement classified as a vehicle arrives, the scaling error can be initialized directly. This increases the association performance in the first radar cycles when a new object is detected. As a result, a gating area when a measurement is associated with a track can be lowered.

In addition, according to some aspects, a database unit 18 including common model parameters is used, being connected to the association and update unit 12 and the common model parameter calculation unit 17 as indicated with dashed arrows in FIG. 3. This is a fixed memory module where model parameters of previous runs are calculated, such as for example a mounting orientation which was estimated the day before.

The data stored in the database unit 18 can for example be used initially in the association and update unit 12 for initialization of new tracks, when no estimate is present yet, or can be used in the common model parameter calculation unit 17 to stabilize the common model parameters. This has the advantage that there is always an initial estimate of common model parameters. Furthermore, the common model parameters are more stable, if previous estimates are integrated in the common model parameter calculation.

According to some aspects, in an example, it is assumed that the radar sensor device 3b is misaligned 3 degrees. On average, radar measurements will consequently be misaligned within 3 degrees. Taking all measurements from all targets, which are detected by the radar sensor device 3b and the camera sensor device 3a, the angular deviation between the radar sensor device 3b and the camera sensor device 3a is on average 3 degrees. This is determined in the in the model parameter estimate unit 16.

Since this deviation varies due to measurement noise of both sensor devices 3a, 3b, a weighted average is calculated based on the variances and estimates of the measurements in the previous radar cycles in the common model parameter calculation unit 17. When the model parameter has been estimated, in the next radar cycle the measurements acquired from the radar sensor device 3b are rotated by −3 degrees. It is likely that the mounting orientation does not change in short term, so this value is stored in database unit 18. In this way, at the next radar cycle, even the first measurements from the radar sensor device 3b can be corrected.

In order to enable estimation of the systematic errors, multiple solutions are according to some aspects possible. Since an estimate of a single measurement has a high uncertainty, multiple measurements are taken into account. If the error is object dependent, this has to be done separately for each object.

Distinction criteria based on data storage can according to some aspects be:

Recursive such that only current estimate has to be stored, resulting in less memory consumption; can for example be realized with a Kalman Filter.

Storage of samples, e.g. ring-buffer, such that a certain amount of single estimates are stored and an estimate over time is calculated and enabling use of robust algorithms; can for example be realized with regression calculation, such as Least-Squares or weighted Total-Least-Squares, and in combination with robust approaches e.g. RANSAC (Random sample consensus).

Distinction criteria based on combination with track states can according to some aspects be:

Direct estimation of states of an object and systematic errors where cross-correlation is taken into account, while having a higher computational complexity; is augmented with a recursive Kalman Filter.

Separate estimation of systematic error and object states; for regression calculation and with a separate recursive Kalman Filter.

Figure 4:
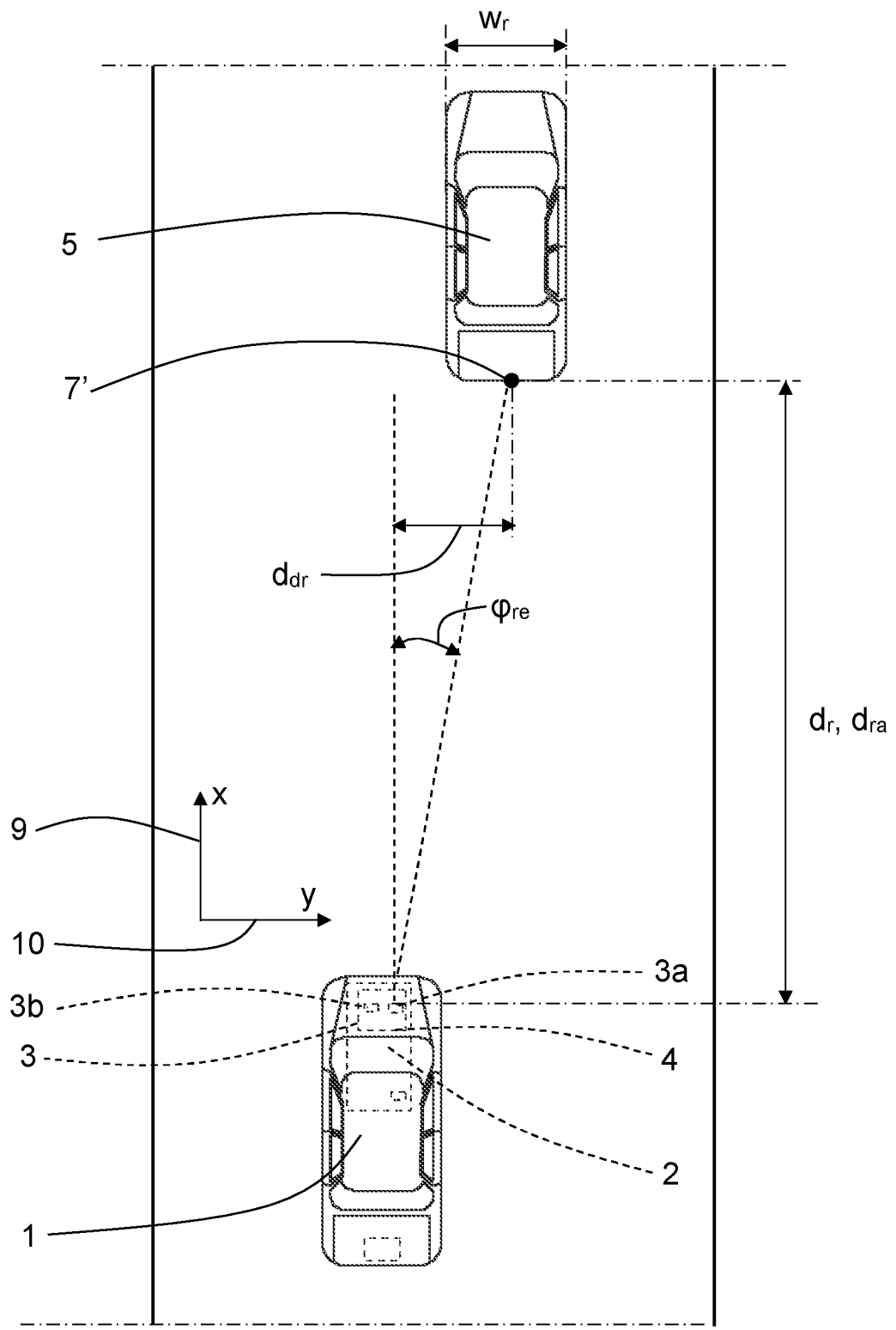
FIG. 4 shows a schematic top view of an ego vehicle and a target vehicle according to a third example.
Figure 5:
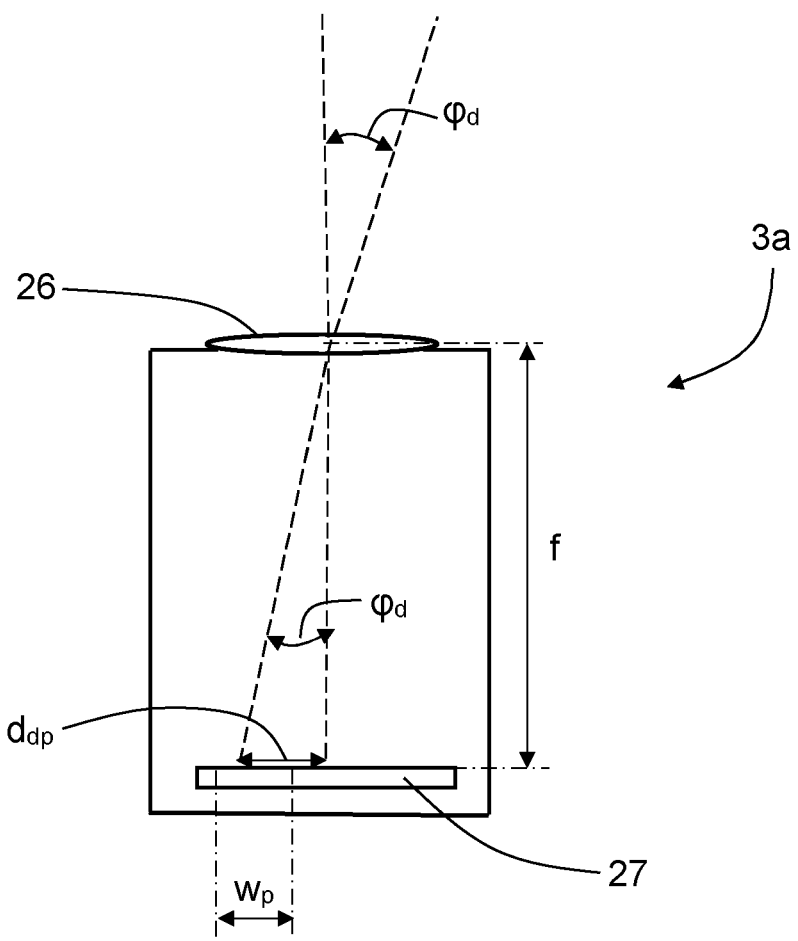
FIG. 5 shows a schematical view of a camera sensor device.
Figure 6:
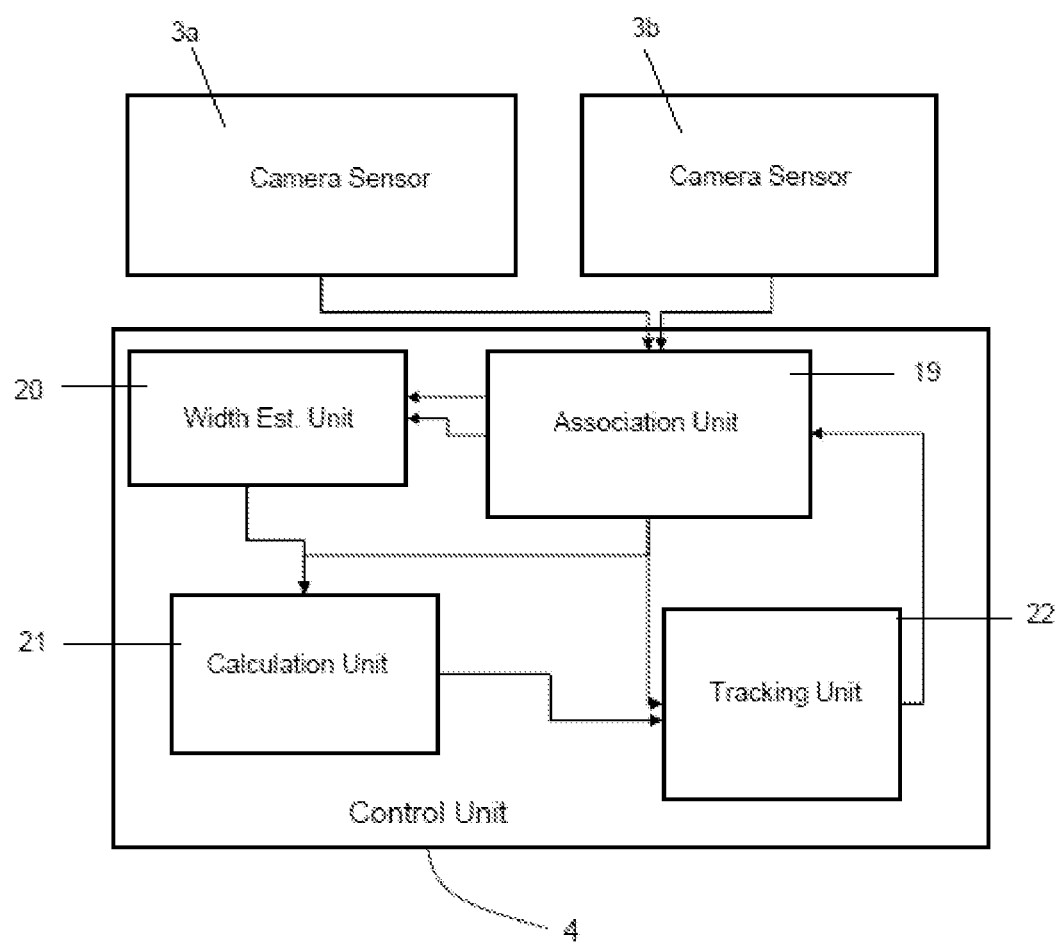
FIG. 6 shows a schematical view of the third example.

With reference to FIG. 4, FIG. 5 and FIG. 6, a third example embodiment is shown. In FIG. 4, the target vehicle 5 in front of the ego vehicle 1 is detected by the radar sensor device 3b and the camera sensor device 3a. The radar sensor device 3b is adapted to provide a radar measured distance $d_{ra}$, that constitutes an estimation of the real distance $d_r$, to a certain radar detection 7' on the target vehicle 5, while the camera sensor device 3a, which is schematically shown in FIG. 5, is adapted to provide a detected pixel width $w_p$ of the target vehicle 5 in camera pixels, which can be mapped using the focal length f of the camera sensor device 3a to real coordinates. The focal length f is measured between a camera lens 26 and a camera image sensor 27, and the pixel width $w_p$ corresponds to a width on the camera image sensor 27.

The real width $w_r$ is calculated as:

$$w_r = \frac{d_{ra}}{f} \cdot w_p.$$

It is here assumed that the radar measured distance $d_{ra}$ equals the real distance $d_r$, since in practice the difference normally is negligible. As mentioned previously, the correct width can be estimated over multiple cycles e.g. by taking the average or using a Kalman Filter, taking measurement uncertainties into account. Generally, an estimation of the real width $w_r$ is calculated according to the above, although in the following, it will be referred to as the real width.

Having retrieved the real width $w_r$, an essentially exact position can be estimated in the following radar cycles using data from the camera sensor device 3a and the object width $w_r$, even if the target vehicle 5 is no longer detectable by the radar sensor device 3b.

Knowing the real width $w_r$ and the pixel width $w_p$ enables the real distance $d_r$ to be calculated as:

$$d_r = \frac{f}{w_p} \cdot w_r.$$

Knowing the real distance $d_r$ and a pixel displacement $d_{dp}$ at the camera image sensor 27, a displacement angle $\varphi_d$ can be determined as:

$$\arcsin(\varphi_d) = \frac{d_{dp}}{f}.$$

Then a real displacement $d_{dr}$ can be calculated as:

$$d_{dr} = \frac{d_r}{f} \cdot d_{dp}.$$

The third example is disclosed in schematical form in FIG. 6, where the camera sensor device 3a is arranged to detect a rear end of target vehicles and to determine the pixel width $w_p$. The radar sensor device 3b is arranged to estimate the real distance $d_r$ to the target vehicle 5. The sensor devices 3a, 3b supply data to an association unit 19 that is arranged to associate the data from the sensor devices 3a, 3b to the same physical object.

The association unit 19 provides input to a width estimation unit 20 that performs a first estimation of an object width followed by an updating step for the object width.

The association unit 19 and the width estimation unit 20 provide input to a calculation unit 21 that is arranged to calculate Cartesian coordinates for the measurements from the camera sensor device 3a. The association unit 19, the width estimation unit 20 and the calculation unit 21 all provide input to a tracking unit 22 that is arranged to track objects over multiple radar cycles, and to provide input to the association unit 19.

All calculations, processes etc. are assumed to be performed by use of the control unit 4.

The above units 19, 20, 21, 22 are embodied in the control unit 4. Generally, the control unit 4 can be provided by one or more separate or integrated control units.

Generally, not only the rear part of the target vehicle 5 can be detected, but also the front part for the case of an oncoming target vehicle, both based on the width of the target vehicle 5. Another option is available for crossing target vehicles where the length of the target vehicle 5 can be estimated to determine the distance to the target vehicle 5.

Figure 7:
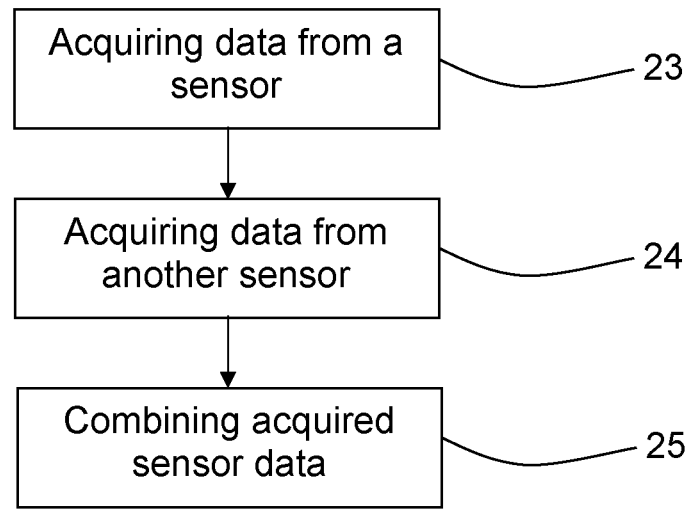
FIG. 7 shows a flowchart for a method according to the present disclosure.

With reference to FIG. 7, the present disclosure relates to a method for determining one or more systematic errors in a certain direction 9, 10 for at least one sensor arrangement part 3a, 3b used in a vehicle environment detection system 2 having at least two sensor arrangement parts 3a, 3b. The method includes the steps of:

Step 23: Acquiring sensor data from the sensor arrangement part 3a, 3b.

Step 24: Acquiring sensor data from another sensor arrangement part 3b, 3a, which another sensor arrangement part 3b, 3a has a lower degree of systematic error in the certain direction 9, 10 than the sensor arrangement part 3a, 3b.

Step 25: Determining one or more systematic errors in the certain direction 9, 10 for the sensor arrangement part 3a, 3b by combining the acquired sensor data from the sensor arrangement parts 3b, 3a.

The present disclosure is not limited to the examples above, but may vary freely within the scope of the appended claims. For example, the camera sensor device 3a includes at least one camera device, where each camera device is arranged for capturing images that either are monochrome or with color, and may be active, i.e. equipped with illumination use. Two or more camera devices may be arranged to produce 3-dimensional picture views.

Generally, the sensor arrangement 3 includes at least a first sensor arrangement part 3a and a second sensor arrangement part 3b, where the sensor arrangement parts 3a, 3b include a corresponding environment data input device, where a systematic detection error of one sensor arrangement part 3b, 3a is corrected by use of detected measurement data acquired by the other sensor arrangement part 3a, 3b. A sensor arrangement part 3b, 3a can in the present context for example be constituted by a radar sensor device, a camera sensor device, a LIDAR (Light detection and ranging) sensor device, and/or an ultrasonic device.

In accordance with the present disclosure, one sensor arrangement part is more accurate in a certain dimension than another sensor arrangement part, and measurements from the more accurate sensor arrangement part are used for correcting measurements from the less accurate sensor arrangement part in the dimension.

The present disclosure enables a plurality of paths for handling systematic errors.

Systematic errors can be calculated based for a single object in a single measurement or over multiple measurements, e.g. average, weighted average, Kalman Filter, or Linear Regression.

Systematic errors can be calculated for all objects detected by a sensor device in a single measurement or during multiple measurements.

Systematic errors can be saved in a non-volatile memory, such that after a system restart, systematic errors which change relatively slowly can be directly re-used.

For a systematic error, an uncertainty or variance, is calculated, e.g. by Least Squares or variance of the estimated width over multiple cycles. The uncertainty of a systematic error is used such that after compensation, the covariances resulting from measurement uncertainty of the detected objects are adapted based on the measurement uncertainty and the uncertainty of the correction parameter.

Instead of the estimation of a systematic error in a model parameters, the model parameters itself can be estimated.

Generally, the present disclosure relates to a vehicle environment detection system 2 including a control unit 4 and a sensor arrangement 3 that in turn includes at least two sensor arrangement parts 3a, 3b. The control unit 4 is arranged to determine one or more systematic errors in a certain direction 9, 10 for one sensor arrangement part 3a, 3b by combining acquired sensor data for the sensor arrangement part 3a, 3b with acquired sensor data from another sensor arrangement part 3b, 3a, which another sensor arrangement part 3b, 3a has a lower degree of systematic error in the certain direction 9, 10 than the sensor arrangement part 3a, 3b.

According to some aspects, the vehicle environment detection system 2 is arranged to be mounted to an ego vehicle adapted to be running forward in an x-direction 9, where a first sensor arrangement part is in the form of a camera sensor device 3a and a second sensor arrangement part is in the form of a radar sensor device 3b, where the camera sensor device 3a has a detection error in the x-direction 9, and where the radar sensor device 3b has a detection error in a y-direction 10, perpendicular to the x-direction 9.

According to some aspects, the camera sensor device 3a is arranged to assume a fixed width $w_f$ of all targets while a target vehicle 5 has a real target vehicle width $w_r$, where a camera measured detection 6 is detected at a camera measured distance $d_c$ that differs from a radar measured distance $d_{ra}$ of a detected radar measured detection 7, where the radar measured distance $d_{ra}$ is closer to a real distance $d_r$ than the camera measured distance $d_c$, where the control unit 4 is arranged to calculate an estimate of the real target vehicle width $w_r$ by multiplying the fixed width $w_f$ with a relation between the radar measured distance $d_{ra}$ and the camera measured distance $d_c$.

According to some aspects, the radar sensor device 3b is adapted to provide a radar measured distance $d_{ra}$ to a certain detection on a target vehicle 5, while the camera sensor device 3a is adapted to provide detected pixel width $w_p$ of the target vehicle 5 in camera pixels, where the control unit 4 is arranged to calculate an estimated real width $w_r$ of the target vehicle 5 according to:

$$w_r = \frac{d_{ra}}{f} \cdot w_p,$$

where $w_r$ is the real width, $d_{ra}$ is the radar measured distance, f is a focal length of the camera sensor device 3a and $w_p$ is the detected pixel width.

According to some aspects, the camera sensor device 3a is adapted to provide a pixel displacement $d_{dp}$ in camera pixels corresponding to a lateral displacement in the y-direction 10 of the target vehicle 5 relative the ego vehicle 1, where the control unit 4 is arranged to calculate a displacement angle $\varphi_d$ as:

$$\arcsin(\varphi_d) = \frac{d_{dp}}{f},$$

where $\varphi_d$ is the displacement angle and $d_{dp}$ is the pixel displacement.

According to some aspects, the control unit 4 is arranged to calculate a real displacement $d_{dr}$ as:

$$d_{dr} = \frac{d_r}{f} \cdot d_{dp},$$

where $d_{dr}$ is the real displacement and $d_r$ is the real distance.

Generally, the present disclosure also relates to a method for determining one or more systematic errors in a certain direction 9, 10 for at least one sensor arrangement part 3a, 3b used in a vehicle environment detection system 2 having at least two sensor arrangement parts 3a, 3b, The method includes the steps of:

Step 23: acquiring sensor data from the sensor arrangement part 3a, 3b;

Step 24: acquiring sensor data from another sensor arrangement part 3b, 3a, which another sensor arrangement part 3b, 3a has a lower degree of systematic error in the certain direction 9, 10 than the sensor arrangement part 3a, 3b; and Step 25: determining one or more systematic errors in the certain direction 9, 10 for the sensor arrangement part 3a, 3b by combining the acquired sensor data from the sensor arrangement parts 3b, 3a.

According to some aspects, the vehicle environment detection system 2 is used in an ego vehicle adapted to be running forward in an x-direction 9, where a first sensor arrangement part is in the form of a camera sensor device 3a and a second sensor arrangement part is in the form of a radar sensor device 3b, where the camera sensor device 3a has a detection error in the x-direction 9, and where the radar sensor device 3b has a detection error in a y-direction 10, perpendicular to the x-direction 9.

According to some aspects, the method includes assuming a fixed width $w_f$ of all targets for the camera sensor device 3a, while a target vehicle 5 has a real target vehicle width $w_r$, where a camera measured detection 6 is detected at a camera measured distance $d_c$ that differs from a radar measured distance $d_{ra}$ of a detected radar measured detection 7, where the radar measured distance $d_{ra}$ is closer to a real distance $d_r$ than the camera measured distance $d_c$, where the method further includes calculating an estimate of the real target vehicle width $w_r$ by multiplying the fixed width $w_f$ with a relation between the radar measured distance $d_{ra}$ and the camera measured distance $d_c$.

According to some aspects, the method includes providing a radar measured distance $d_{ra}$ to a certain detection on a target vehicle 5, while the camera sensor device 3a is used for providing detected pixel width $w_p$ of the target vehicle 5 in camera pixels, where the method further includes calculating an estimation of a real width $w_r$ of the target vehicle 5 according to:

$$w_r = \frac{d_{ra}}{f} \cdot w_p,$$

where $w_r$ is the real width, $d_{ra}$ is the radar measured distance, f is a focal length of the camera sensor device 3a and $w_p$ is the detected pixel width.

According to some aspects, the camera sensor device 3a is used for providing a pixel displacement $d_{dp}$ in camera pixels corresponding to a lateral displacement in the y-direction 10 of the target vehicle 5 relative the ego vehicle 1, where the method further includes calculating a displacement angle $\varphi_d$ as:

$$\arcsin(\varphi_d) = \frac{d_{dp}}{f},$$

where $\varphi_d$ is the displacement angle and $d_{dp}$ is the pixel displacement.

According to some aspects, the method further includes calculating a real displacement $d_{dr}$ as:

$$d_{dr} = \frac{d_r}{f} \cdot d_{dp},$$

where $d_{dr}$ is the real displacement and $d_r$ is the real distance.

While the above description constitutes the preferred embodiment of the present invention, it will be appreciated that the invention is susceptible to modification, variation and change without departing from the proper scope and fair meaning of the accompanying claims.

The invention claimed is:

1. A vehicle environment detection system comprising, a control unit and a sensor arrangement that in turn includes at least first and second sensor arrangement parts, the control unit determines one or more systematic detection errors in a measurement in a certain direction for the first sensor arrangement part by combining acquired sensor data for the first sensor arrangement part with acquired sensor data from the second sensor arrangement part, which one of the first and second sensor arrangement parts has a lower degree of the systematic detection error in the measurement in a certain direction than another of the first and second sensor arrangement parts.

2. The vehicle environment detection system according to claim 1 further comprising, the vehicle environment detection system is arranged to be mounted to an ego vehicle adapted to be running forward in an x-direction, where the first sensor arrangement part is in the form of a camera sensor device and the second sensor arrangement part is in the form of a radar sensor device, where the camera sensor device has a detection error in the x-direction, and where the radar sensor device has a detection error in a y-direction, perpendicular to the x-direction.

3. The vehicle environment detection system according to claim 2 further comprising, the camera sensor device is arranged to assume a fixed width ($w_f$) of all targets while a target vehicle has a real target vehicle width ($w_r$), where a camera measured detection is detected at a camera measured distance ($d_c$) that differs from a radar measured distance ($d_{ra}$) of a detected radar measured detection, where the radar measured distance ($d_{ra}$) is closer to a real distance ($d_r$) than the camera measured distance ($d_c$), where the control unit is arranged to calculate an estimate of the real target vehicle width ($w_r$) by multiplying the fixed width ($w_f$) with a relation between the radar measured distance ($d_{ra}$) and the camera measured distance ($d_c$).

4. The vehicle environment detection system according to claim 2 further comprising, the radar sensor device is adapted to provide a radar measured distance ($d_{ra}$) to a certain detection on a target vehicle, while the camera sensor device is adapted to provide a detected pixel width ($w_p$) of the target vehicle in camera pixels, where the control unit is arranged to calculate an estimated real width ($w_r$) of the target vehicle according to:

$$w_r = \frac{d_{ra}}{f} \cdot w_p.$$

wherein f is a focal length of the camera sensor device.

5. The vehicle environment detection system according to claim 4 further comprising, the camera sensor device is adapted to provide a pixel displacement ($d_{dp}$) in camera pixels corresponding to a lateral displacement in the y-direction of the target vehicle relative to the ego vehicle, where the control unit is arranged to calculate a displacement angle ($\varphi_d$) as:

$$\arcsin(\varphi_d) = \frac{d_{dp}}{f}.$$

6. The vehicle environment detection system according to claim 5 further comprising, the control unit is arranged to calculate a real displacement ($d_{dr}$) as:

$$d_{dr} = \frac{d_r}{f} \cdot d_{dp}.$$

7. A method for determining one or more systematic detection errors in a measurement in a certain direction for at least one sensor arrangement part used in a vehicle environment detection system having at least first and second sensor arrangement parts comprising the steps of:
  acquiring sensor data from one of the first and second sensor arrangement parts;
  acquiring sensor data from another of the first and second sensor arrangement parts, which another sensor arrangement part has a lower degree of the systematic detection error in a measurement in the certain direction than the one sensor arrangement part; and
  determining one or more systematic detection errors in the measurement in certain direction for the one sensor arrangement part by combining the acquired sensor data from the first and second sensor arrangement parts.

8. The method according to claim 7 further comprising the steps of, the vehicle environment detection system is used in an ego vehicle adapted to be running forward in an x-direction, where the first sensor arrangement part is in the form of a camera sensor device and the second sensor arrangement part is in the form of a radar sensor device, where the camera sensor device has a detection error in a measurement in the x-direction, and where the radar sensor device has a detection error in a measurement in the y-direction, perpendicular to the x-direction.

9. The method according to claim 8 further comprising the steps of, assuming a fixed width ($w_f$) of all targets for the camera sensor device, while a target vehicle has a real target vehicle width ($w_r$), where a camera measured detection is detected at a camera measured distance ($d_c$) that differs from a radar measured distance ($d_{ra}$) of a detected radar measured detection, where the radar measured distance ($d_{ra}$) is closer to a real distance ($d_r$) than the camera measured distance ($d_c$), where the method further includes calculating an estimate of the real target vehicle width ($w_r$) by multiplying the fixed width ($w_f$) with a relation between the radar measured distance ($d_{ra}$) and the camera measured distance ($d_c$).

10. The method according to claim 8 further comprising the steps of, providing a radar measured distance ($d_{ra}$) to a certain detection on a target vehicle, while the camera sensor device is used for providing detected a pixel width ($w_p$) of the target vehicle in camera pixels, and calculating an estimation of a real width ($w_r$) of the target vehicle according to:

$$w_r = \frac{d_{ra}}{f} \cdot w_p,$$

where f is a focal length of the camera sensor device.

11. The method according to claim 10 further comprising, the camera sensor device is used for providing a pixel displacement ($d_{dp}$) in camera pixels corresponding to a lateral displacement in the y-direction of the target vehicle relative to the ego vehicle, where the method further includes calculating a displacement angle ($\varphi_d$) as:

$$\arcsin(\varphi_d) = \frac{d_{dp}}{f}.$$

12. The method according to claim 11 further comprising the step of, calculating a real displacement ($d_{dr}$) as:

$$d_{dr} = \frac{d_r}{f} \cdot d_{dp}.$$

* * * * *